UNITED STATES PATENT OFFICE.

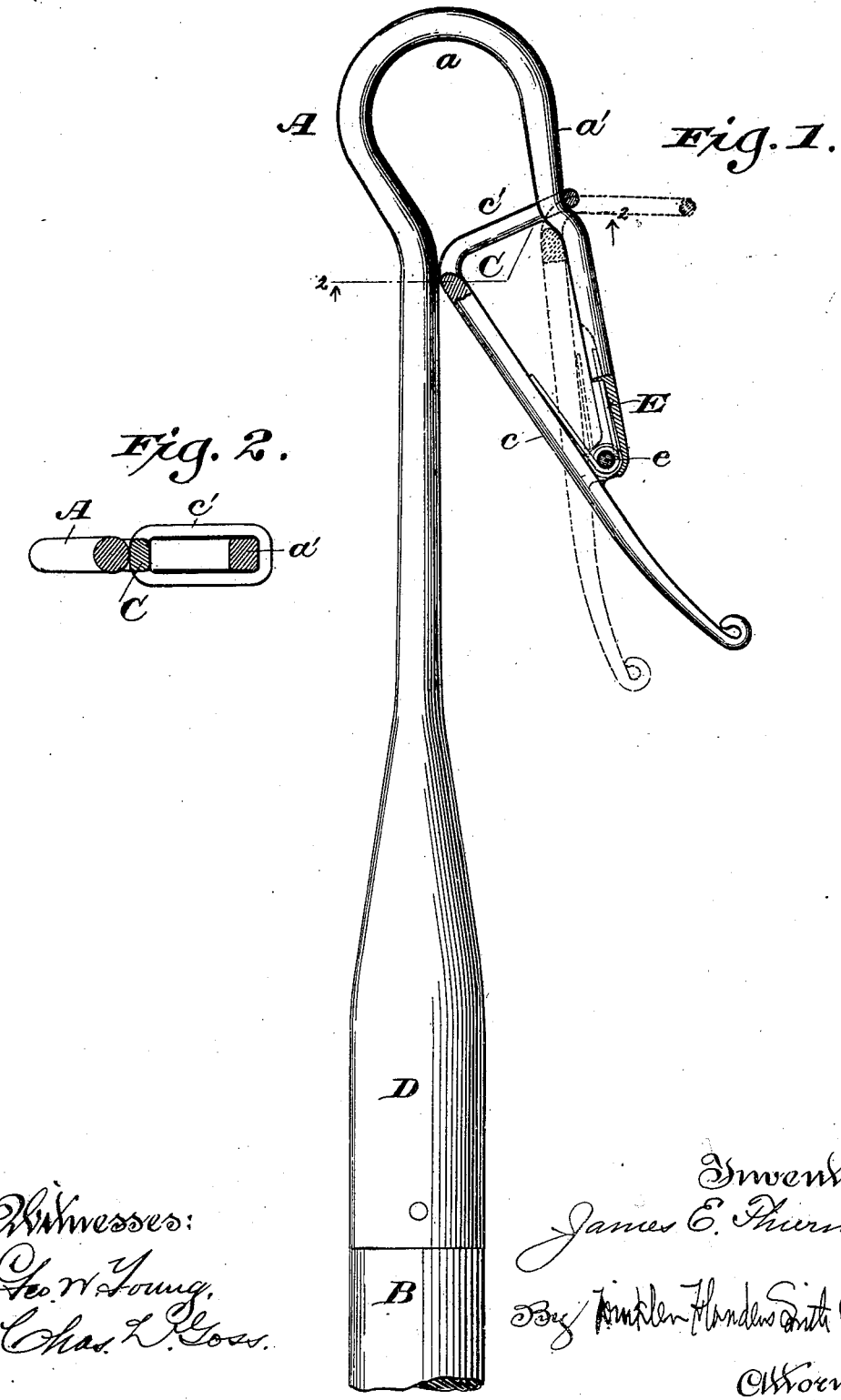

JAMES E. THURMOND, OF BILLINGS, MONTANA, ASSIGNOR OF ONE-HALF TO CHRISTIAN YEGEN, OF SAME PLACE.

SHEPHERD'S CROOK.

SPECIFICATION forming part of Letters Patent No. 673,629, dated May 7, 1901.

Application filed September 25, 1899. Serial No. 731,553. (No model.)

*To all whom it may concern:*

Be it known that I, JAMES E. THURMOND, a citizen of the United States, residing at Billings, in the county of Yellowstone and State of Montana, have invented certain new and useful Improvements in Shepherds' Crooks, of which the following is a specification, reference being had to the accompanying drawings, forming a part thereof.

The main objects of my invention are to facilitate catching and holding sheep or other animals by the leg, and generally to improve the construction and operation of devices of the class to which the invention relates.

It consists of certain novel features in the construction and arrangement of component parts of the device, as hereinafter particularly described, and pointed out in the claims.

In the accompanying drawings like letters designate the same parts in both figures.

Figure 1 is a side elevation of a portion of a shepherd's crook embodying my improvements, portions of the hook and stop or latch being broken away to more clearly show their construction; and Fig. 2 is a cross-section on the line 2 2, Fig. 1.

A designates the hook, B the staff or handle, and C the stop or latch, constituting the main essential parts of the crook.

The shank of the hook A, which is preferably made of malleable iron, is formed with a socket D to receive the end of the staff or handle B, which may be made of wood. That portion of the hook forming the bend $a$ is made round or oval and smooth on the inside to avoid cutting, bruising, or injuring the legs of animals caught and held therein. The stop or latch C is made of angular form. Its longer arm $c$ is pivoted about midway between its ends to the point of the hook A, the shorter arm $c'$ being slotted or looped for the shorter limb $a'$ of the hook to pass through it.

The spring E, which is preferably made of brass wire, is coiled around the pivot-pin $e$ and bears at one end against the outer side of the stop and at the other end against the inner side of the hook, which is preferably grooved or recessed, as shown in Fig. 1, to receive and hold it in place. The shorter limb $a'$ of the hook is formed with a slight outward bend, producing on the inside an offset or depression to receive the stop C when the latter is opened and to bring the inner face of the arm $c$ in line with the inner face of the hook, as indicated by dotted lines in Fig. 1, thus presenting a straight smooth surface to the leg of an animal when the crook is drawn into engagement therewith. The bend in the shorter limb of the hook also forms a depression in the outer side thereof, in which the outer end of the looped or slotted arm $c'$ is seated and supported when the stop is closed, as shown by full lines in Fig. 1. The angle or elbow of the stop is held normally by the spring E against the longer limb or shank of the hook when the stop is closed, the shorter arm $c'$ extending transversely across and closing the space between the two limbs of the hook. The limbs of the hook converge from the bend $a$ toward the stop, and the longer limb or shank is preferably bent outwardly away from the shorter limb between the stop and the bend. The longer arm $c$ of the stop, diverging from the shank of the hook toward its rear or outer end and extending beyond the point of the hook, serves as a guide to direct the hook into engagement with the leg of an animal caught by the crook, and the rear or outward end of said arm serves as a handle or thumbpiece for opening the stop or latch to release the animal. The wide opening or space normally presented between the outer or rear end of the arm $c$ of the stop and the longer limb or shank of the hook greatly aids in catching an animal by the leg, and the rearwardly-projecting end of the arm $c$ makes it easy to open the stop and release the animal held by the crook.

By the construction hereinbefore described, the stop being pivoted to the point of the hook and the arm $c'$ being looped or slotted to allow the shorter limb of the hook to pass through it, rivets and holes are avoided, which would otherwise weaken the hook or necessitate its being made heavier. The construction and arrangement of the stop and the employment of a separate spring, arranged as described, for closing the stop avoid undue strain upon and injury to the spring, which is not affected by the kicking or turning of the animal held by the crook. A weak, defective, or broken spring may also be readily replaced by removing the pivot-pin $e$. Any pressure or force exerted against the stop by the leg of an animal held in the crook tends to close the stop more tightly, and consequently a light and comparatively weak spring may be used. For this reason the stop will open more readily and the engagement of the crook with the leg of an animal will be effected more easily than if a stiff spring, which is necessary in the construction of other crooks, were employed.

I claim—

1. In a shepherd's crook the combination with a hook, of an angular stop pivoted to the point of the hook and having a transverse arm extending normally across and closing the space between the limbs of the hook and a spring tending to close the stop, substantially as and for the purposes set forth.

2. In a shepherd's crook the combination with a hook, of a stop pivoted to the point of the hook and having a transverse slotted or looped arm through which the shorter limb of the hook passes, and a spring tending to hold the stop closed, substantially as and for the purposes set forth.

3. In a shepherd's crook the combination with a hook, of an angular stop the longer arm of which is pivoted between its ends to the point of the hook and serves as a guide for directing the hook into engagement with the leg of an animal, and a spring tending to hold said stop with its shorter arm transversely across the space between the limbs of the hook, substantially as and for the purposes set forth.

4. In a shepherd's crook the combination with a hook, of a stop pivoted to the point of the hook, and a spring coiled around the pivot-pin of the stop and bearing at one end against the outer side of the stop and at the other end against the inner side of the hook, substantially as and for the purposes set forth.

In witness whereof I hereto affix my signature in presence of two witnesses.

JAMES E. THURMOND.

Witnesses:
   FRED J. MASHAW,
   J. S. SIMINEO.